Oct. 17, 1939.  C. D. COMSTOCK  2,176,167
REAR VIEW EYEGLASS REFLECTOR
Filed Dec. 21, 1937
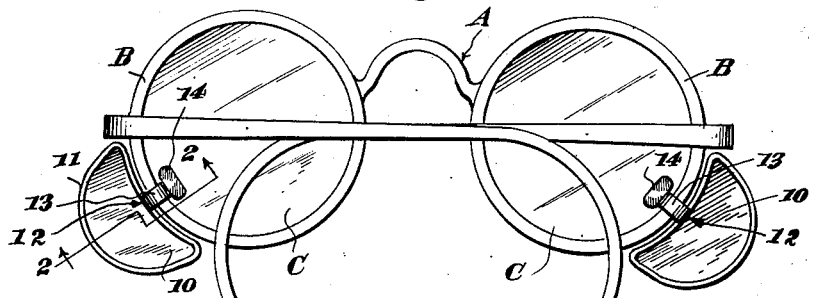
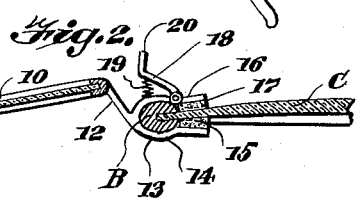
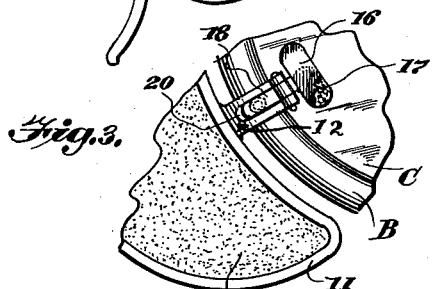
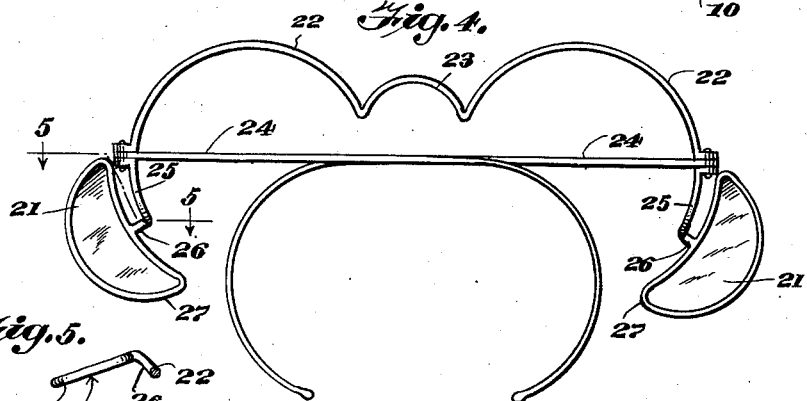
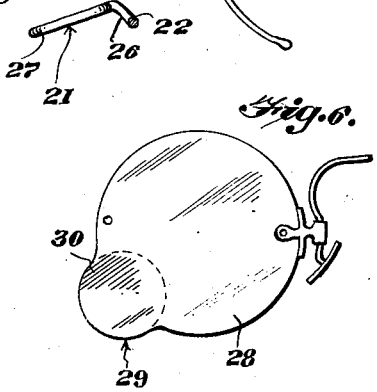
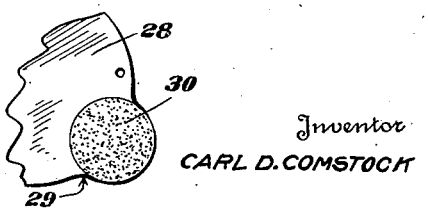
Inventor
CARL D. COMSTOCK
By Irving A. McCathran
Attorney Patented Oct. 17, 1939

2,176,167

UNITED STATES PATENT OFFICE 2,176,167

REAR VIEW EYEGLASS REFLECTOR

Carl D. Comstock, Santa Fe, N. Mex.

Application December 21, 1937, Serial No. 181,042

2 Claims. (Cl. 88—41)

This invention relates to rear view eye-glass reflectors, and has for one of its objects the production of a simple and efficient means for facilitating rear vision by the wearer thereof without interfering with the normal front vision of the wearer.

A further object of the invention is the production of a simple and efficient rear vision mirror for eye-glasses and the like, wherein the mirror is located at the outer edge of the supporting lens just below the outside center of the lens, for supporting the mirror in a position to obtain maximum rear vision without interfering with the normal front vision of the wearer.

Another object of this invention is the production of a simple and efficient detachable rear view mirror for use in attaching the same to eye-glasses and the like, whereby the mirror will be efficiently held in an operative position.

Other objects and advantages of the invention will appear throughout the following specification and claims.

In the drawing:

Figure 1 is a rear elevational view of a pair of eye-glasses showing the rear view mirrors applied thereto;

Figure 2 is a sectional view taken on line 2—2 of Figure 1;

Figure 3 is a fragmentary front elevational view of a portion of a lens and a portion of a mirror, illustrating the fastening clamp;

Figure 4 is a rear elevational view of a special frame and mirror structure;

Figure 5 is a sectional view taken on line 5—5 of Figure 4;

Figure 6 is a rear elevational view of a modified type of the invention;

Figure 7 is a fragmentary front elevational view of a portion of the lens carrying the mirror of the type shown in Figure 6.

By referring to the drawing, it will be seen that A designates a conventional pair of eye-glasses, having a conventional rim structure B. A rear view mirror 10 is secured to each lens C, of the eye-glasses at a point along the outer edge of the rim structure B and just below the outside center of each lens, as shown in Figure 1. The rear view mirror 10 is preferably segmental-shaped and because of its shape and position, the mirror will fit into the slight depression at each side of the head just above the cheek bones and provide a greater range of vision and a minimum obstructed rear and side view.

Each mirror 10 is carried by a frame 11, which is supported by an arm 12 carried by a clamp 13, which clamp 13 supports the mirror at an incline to the longitudinal axis of the lens C, the mirror 10 being inclined rearwardly toward its outer edge and offset forwardly with respect to the clamp 13, at its inner edge, as shown clearly in Figure 2. The clamp 13 comprises a stationary jaw 14 having a gripping shoe or pad 15 which engages the inner face of the lens C, as shown in Figure 2, and a spring-pressed pivoted jaw 16 having a gripping shoe 17 which engages the outer face of the lens C. The pivoted jaw 16 carries an outwardly extending arm 18 which is engaged by the spring 19 for holding the jaw 16 in a closed position. The arm 18 terminates in an angularly extending finger-piece 20 to facilitate the opening of the jaw 16 when it is desired to remove or attach the rear view mirror 10.

In Figure 4, I have shown a special supporting frame construction for supporting the rear view mirrors 21, independently of a pair of eye-glasses, wherein a pair of segmental rims 22 are connected by a nose-piece 23, and these rims 22 are engaged by the bows 24. The rims 22 terminate in depending ends 25 and each end 25 carries a forwardly extending and outwardly inclined arm 26 which carries a frame 27 within which the mirror 21 is mounted. The arm 26 supports the mirror 21 in each instance, at an incline to the longitudinal axis of the supporting frame, the outer edge of the mirror being inclined rearwardly, and the inner edge being offset forwardly of the supporting frame, as shown in Figure 5. The mirrors 21 at each side of the supporting frame are located along the outer edge of the rims 22 and below the outside center of the rims 22, as shown in Figure 4.

In Figures 6 and 7, I have shown a lens 28, having an extension 29 formed integral with the lens 28 located along the outer edge of the lens and below the outside center of the lens. This extension constitutes a rear view mirror 30. It should be noted that in all forms shown and described, the mirrors are located in the same relative position with respect to the supporting frame, lens, and the like.

Through the medium of the present device, a clear direct rear and side view is provided for the user, simultaneous with the frontal vision, thereby providing valuable protection and convenience in various ways to both life and limb at street intersections and other places.

By noting Figure 2 it will be seen that the rim B is slightly greater in diameter than the thickness of the lens C and the clamp 13 straddles the rim in such a manner as to hold the mirror in place and prevent the same from accidentally creeping off or falling out of engagement with the lens since the gripping shoes or pads 17 by abutting against the rim B will prevent the mirror from being accidentally pulled transversely off the rim B, or accidentally slipping therefrom.

It should be understood that certain detail changes in the mechanical construction may be employed without departing from the spirit of the invention, so long as such changes fall within the scope of the appended claims.

Having described the invention, what I claim as new is:

1. A rear view mirror comprising a frame, a mirror carried by said frame, the frame having a rim surrounding said mirror, a spring clamp having a U-shaped portion for straddling the rim of a pair of eye-glasses, one arm of said clamp terminating in a stationary jaw for engaging one face of the lens at a point beyond the rim, a second jaw pivoted to the other arm of the clamp for engaging the other face of the lens opposite the first jaw and cooperating with the stationary jaw to grip the lens whereby the mirror will be firmly held in place and prevented from accidentally slipping out of engagement with the lens, a finger-piece extending outwardly from the pivoted end of the pivoted jaw, a spring engaging said finger-piece and urging the pivoted jaw to a gripping position, and an arm connecting said clamp with said mirror frame and extending at an angle to dispose the mirror at an incline relative to the eye-glass lens.

2. In combination with eye-glasses having a frame and a lens carried by the frame, the frame being provided with a rim surrounding the lens; a rear view mirror, a frame for said mirror, a clamp carried by the mirror frame and straddling the rim of the glasses and having means for gripping the lens at a point spaced from the rim and firmly holding the mirror against accidentally slipping from the eye-glasses, and an outwardly extending forwardly inclined arm connecting said clamp with said mirror frame, said arm extending at an incline to the clamp and the mirror whereby the mirror will be disposed diagonally of the eye-glass lens and extend outwardly at a rearward incline, said clamp comprising a substantially U-shaped portion having curved arms for gripping about the eye-glass rim, one arm of the clamp terminating in a straight stationary jaw and carrying a pad, the other arm terminating in a pivoted jaw carrying a pad, a finger-piece extending outwardly from the pivoted jaw, and a spring operating again said finger piece for urging the pivoted jaw to a gripping position.

CARL D. COMSTOCK.